United States Patent Office 3,286,562
Patented Nov. 22, 1966

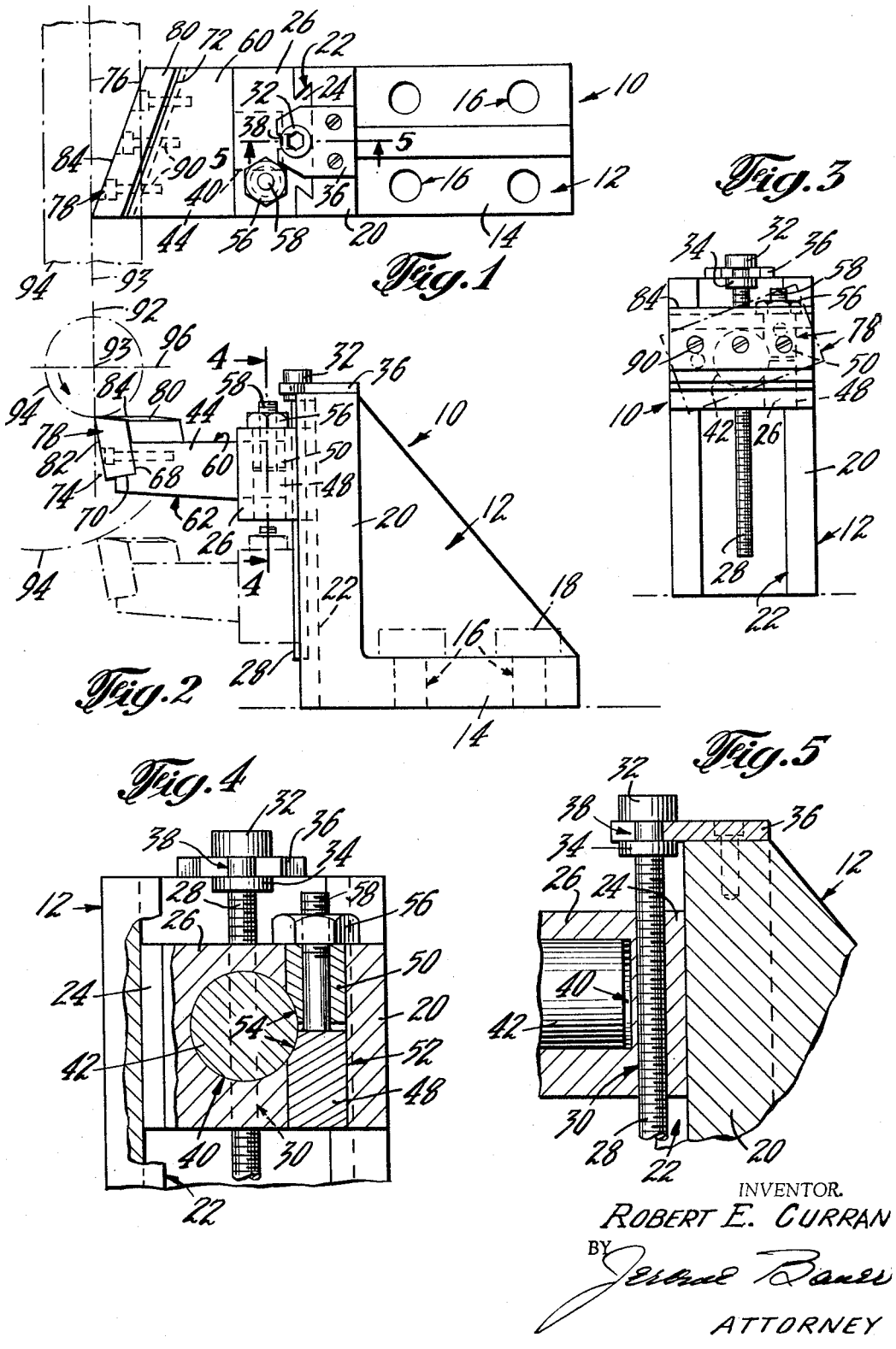

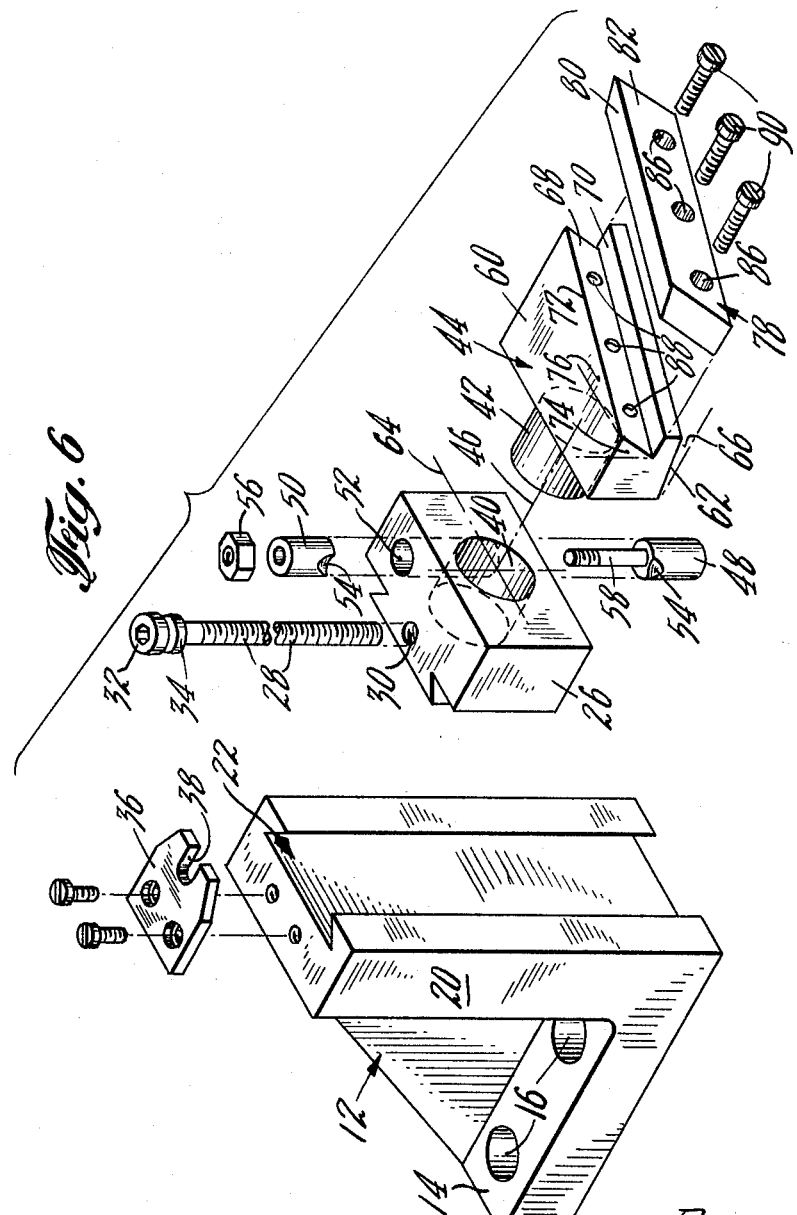

3,286,562
TANGENT FORM TOOL
Robert E. Curran, 56 Grandview St., Huntington, N.Y.
Filed Dec. 9, 1964, Ser. No. 417,097
8 Claims. (Cl. 82—36)

This invention relates to tangent form tools and, more particularly, to the novel combination of a work forming tool and its holding structure.

In the past, the use of tangent form tools has been restricted because of the difficulties involved in setting up the tool with respect to the workpiece and properly positioning the tool so that it may cut and form the workpiece properly. In the set-up of a tangent form tool, it is necessary that the cutting or forming edge of the tool itself be positioned at a shear angle or at an angle of approach to the workpiece such that the tool progressively engages the workpiece along its forming edge and, therefore, the forming edge engages the workpiece only a small portion at a time. Further, it is important that the forming tool be provided with a front rake or clearance angle as well as a top take or clearance angle. In the past, simple tangent form tools have required the expenditure of much time and effort as well as the presence of a skilled mechanic, utilizing delicate measuring instruments, to properly position the forming edge of the tool relative to the workpiece in the manner described.

The desideratum of the present invention is the provision of a tangent form tool that is so simple in construction that its manner of use does not require the presence of a skilled mechanic and elminates the need for expensive measuring tools. In consequence, the present invention will make it easier to use tangent form tools and, therefore, more readily adaptable for the performance of high quality but inexpensive work.

Another object of the invention is to provide a relatively inexpensive tangent form tool that is simple to manufacture, one that in carrying out the purposes and objects of the invention, includes as a feature thereof details of construction that automatically position the forming edge at the proper shear angle relative to the workpiece and simultaneously locates the forming tool with the proper front rake, and top rake, or clearance angles.

Still another object and feature of the invention resides in the novel combination of a forming tool element and holder structure therefor that is capable of automatically locating and positioning the forming edge of the tool with respect to the workpiece and also whereby the forming tool element itself may be provided with a top rake or clearance angle of a desired magnitude simply by securing the forming tool element to its holder structure and then properly positioning the holder structure on a grinding wheel to form the desired top rake angle on the top surface of the forming tool element.

Other and further objects of this invention reside in the structures and arrangements hereinafter more fully described with reference to the accompanying drawings in which:

FIG. 1 is a top view of the tangent form tool constructed according to the invention, FIG. 2 is a side view of the tangent form tool, FIG. 3 is a front view, FIG. 4 is a partial cross-section of FIG. 2 taken along lines 4—4, FIG. 5 is a partial cross-section of FIG. 1 taken along lines 5—5, and FIG. 6 is an exploded perspective view of the tangent form tool.

Referring now to the drawings, the tangent form tool thereshown is generally identified by the numeral 10. The tool 10 is composed of numerous elements, one of which comprises a support member 12 that is adapted to be secured to the bed of any lathe or other suitable work rotating machine. For this reason, the support member 12 has a base 14 in which there is provided a plurality of openings 16 through which bolts or other suitable securing means 18 (FIG. 2) may extend. The support member 12 has an upright or vertically extending body 20 in which there is defined a dove-tail slide guide 22. The slide guide 22 is directed vertically with respect to the base 14 and is adapted to receive a mating male-shaped dove-tail guide formation 24 defined at the back of a slide member 26.

The male guide formation 24 defined at the rear of the slide member 26 is adapted to mate with and be guided for movement vertically along the dove-tail guide 22 of the support member 12. The slide member 26 is adapted to be slidingly moved by a threaded bolt 28 that engages with mating threads 30 provided in the dove-tail guide formation 24. The bolt 28 is provided with spaced heads 32 and 34 that engage with the upper and lower sides of a fixed plate 36 secured at the very top of the body 20 in alignment with the threaded opening 30 of the slide member 26. The plate 36 is provided with a yoke opening 38 in which the body portion, positioned between the heads 32 and 34 of the bolt 28, is received.

The slide member 26 is provided on its front surface with an aperture 40 that is adapted to receive the shank 42 of a tool holder member 44. In this way, the member 44 is able to move vertically up and down with the slide member 26. The shank 42 is located on the rear face of the tool holder member 44 and has a snug but sliding fit engagement with the aperture 40 so that the tool holder member can be rotated relative to the slide member 26 about a common axis of rotation 46 (see FIG. 6). The slide member carries a clamp or tool holder securing means of two-part construction 48 and 50.

The lower part of the clamp 48 extends upward from the bottom of the slide member into an opening 52 defined therein. The nut or top member 50 of the two-part clamp projects downward into the opening 52. Both the nut 50 and the screw 48 are provided with mating circularly shaped portions 54. These portions 54 conform to the shape of the circular shank 42 to engage the same, as in FIG. 4, when the shank is to be clamped or secured in a position of selected rotative adjustment within the aperture 40 of the slide guide such as shown in broken lines in FIG. 3. The nut 50 is provided with a rotating nut element 56 which is adapted to engage the threaded extension 58 of the lower member 48 to be tightened down therealong. This moves the two-parts 48 and 50 toward each other within the opening 52 so that their portions 54 will engage and tightly clamp against the shank 42 to prevent the rotation of the tool holder member 44 relative to the slide member 26.

The tool holder member 44 is formed with a top planar surface 60 and a bottom planar surface 62. The top planar surface 60 is normally positioned in a horizontal plane that is parallel to the horizontal 64 (FIG. 6) of the axis of rotation 46. The bottom or base planar surface 62 is directed at an angle 66 to the horizontal plane 64 of the axis of rotation 46 of the holder member 44. The size or magnitude of the base angle 66 may be between 0° and 2°, but preferably it is at an angle of 1° for a purpose to be described.

The front of the tool holder member 44 is provided with a tool seat. The seat is defined by two walls or surfaces 68 and 70 that are positioned at right angles or normal to each other. The seat defined by the walls 68 and 70 is inclined or tilted relative to the horizontal 64 of the axis of rotation 46 of the holder member 44. Hence, the seat extends inward into the holder member so that the corner formed by the two walls 68 and 70 is positioned well into and remote from the top edge 72 of the holder member 44.

The angle of inclination or tilt that the wall 68 forms relative to the top planar surface 60 or to the horizontal 64 is between 8° and 23°, but preferably the angle is 15°. This angle is identified in FIG. 6 by the numeral 74. The seat surfaces 68 and 70 are disposed at a shear or approach angle to the axis of rotation of the holder member 44 of between 10° and 30° and preferably 20°. This shear or approach angle is identified in FIG. 6 by the numeral 76.

The tool holder member 44 is adapted to be utilized in combination with a forming tool element generally identified by the numeral 78. Initially, the forming tool element 78 is substantially rectangular in cross-section with its top surface 80 and front surface 82 at right angles or normal to each other defining a forming edge 84 therebetween. The forming tool element 78 is provided with a plurality of through openings 86 that mate with threaded openings 88 provided in the seat wall 68. Bolts or other suitable securing means 90 are adapted to be extended through the openings 86 for engagement with the threaded openings 88 in order to secure the forming tool element 78 as a whole to the seat of the tool holder member 44 to form an integral part thereof. When the forming tool element 78 is so secured to the seat of the tool holder member 44, both function as a unitary structure. That is to say, whatever movement or motion is imparted to the tool holder member 44 or in whatever position the tool holder member is placed, the forming tool element 78 will be correspondingly positioned.

The importance of this relationship should be apparent since it is this relationship between the forming tool element 78 and the tool element holder 44 that renders the invention unique. When the forming tool element 78 is secured in the seat of the tool holder member, the front surface 82 of the element 78 is tilted inward and assumes a natural rake or clearance angle with respect to the horizontal 64 of the axis of rotation 46 of the tool holder member 44. Similarly, the front surface 82 retains its rake or clearance angle when moved with respect to a vertical plane 92 (FIG. 2) drawn through the axis of rotation 93 of the workpiece 94.

At the same time, the unshaped or unformed top surface 80 of the forming tool element 78 would normally assume a negative top rake angle relative to the horizontal plane 64 and relative to the horizontal plane 96 of the workpiece since the top surface 80 is at right angles to the front surface 82. Therefore, it is necessary to shape and form the top surface 80 of the forming tool element 78 to the particular contour or configuration which it is subsequently desired to form the workpiece 94. In practice, the top surface 80 is ground or formed in a grinder or grinding machine so that its contour or shape produces a corresponding shape on the forming edge 84 that later engages and correspondingly forms the rotating workpiece 94.

In the present invention, the top surface 80 is shaped to the desired contour and simultaneously provided with the desired rake angle while it is unitarily secured to and forms an integral part of the holder 44. This is done by unclamping the shank 42 at 48 and 50 and removing the holder 44 and tool element 78 bodily from the slide member 28. The tool holder member 44 is then placed on the flat surface of the grinding machine on its bottom or base planar surface 62. When so rested on the grinding machine, the member 44 tilts forward because of the angle 66 the surface 62 normally makes with the horizontal plane 64. The top surface 80 of the tool element 78 is then ground to form the desired contour along the forming edge 84. During the grinding operation, a portion of the surface 80 is removed at an angle corresponding and parallel to but opposite from that of the angle 66.

However, those skilled in the art will recognize that if the angle 66 is 1° and if the angle of the seat surface 68 is 15°, the total normal angle of tilt of the surface 80 on the grinding machine will be 16°. Therefore, because the top surface 80 of the tool element 78 will be tilted 16° with respect to the grinding machine surface, 16° of the top surface 80 will be ground away and removed during the shaping thereof. In consequence, when the tool holder member 44 is reclamped in the slide member 26, the top surface 80 will have a top rake angle or clearance of 1° with respect to the horizontal plane 96 of the workpiece 94.

This simple arrangement and combination of tool holder and tool element structure enables the user of the tool 10 to quickly and easily form the proper top clearance angle on the forming tool element 78. The size or magnitude of the top clearance angle should be between 0° and 2° but preferably 1°. However, it is selectively controllable by providing the base or bottom planar surface 62 with a corresponding angle 66. If the surface 62 is at 0°, the top surface 80 will be ground an angular amount equal to the tilt or angular inclination of the seating surface 68. If the angular relationship of the surface 62 with respect to the plane 64 is 2°, then the top surface 80 will be ground away parallel to the surface 62 or an angle of an amount equal to the slope of the surface 62 plus that of the angular tilt or inclination of the surface 68. In practice, it is known that the shallower the rake angle of the top surface 80, the greater the burnishing effect the cutting edge 84 of the tool will produce on the workpiece 94.

FIG. 2 illustrates the slide member 26 in different positions of vertical relationship relative to the axis of rotation 93 of the workpiece 94. Thus, the full line position illustrates the operation of the tangent form tool 10 on a small diameter workpiece whereas the dash line position illustrates its operation on a larger diameter workpiece. FIG. 3 illustrates a full line position wherein the tool holder member 44 is in a horizontal position. The broken line position illustrates that the tool holder member 44 may be rotated through any desired angle. When the tool holder member is so rotated relative to the workpiece, the forming edge 84 will be angularly rotated relative to the axis of rotation 93 of the workpiece 94 and will produce a corresponding taper on the workpiece.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

1. A tool for forming a workpiece rotating about an axis,
    said tool comprising a support member having a guide,
    a slide movable along said guide,
    means engageable between said member and slide to move said slide along said guide,
    a holder having a seat,
    said holder being movable with said slide and rotatable relative thereto about an axis,
    a forming tool of substantially rectangular cross-section secured in said seat and having a work forming edge,
    said seat being at an angle inclined relative to the horizontal of the axis of rotation of said holder to incline said forming tool to position the defining walls of said forming edge at rake angles with respect to the axis of rotation of the workpiece,
    and said seat being at an angle transverse to the vertical of the axis of rotation of said holder to position the forming edge of said tool at a shear angle with respect to the axis of rotation of the workpiece.

2. A tool for forming a workpiece rotating about an axis,
    said tool comprising a support member having a guide, a slide movable relative to said support member and along said guide, a holder on said slide for movement therewith and having an axis of rotation relative to said slide about which said holder is selectively rotatable to an angular position of adjustment, clamp means to clamp said holder in a selected position of rotative adjustment, a forming tool of substantially rectangular cross-section having a forming edge defined between front and top surfaces, means to secure said forming tool to said seat for movement with said holder, said seat being tilted in said holder to tilt said forming tool to position said front surface at a front rake angle and said top surface at a top rake angle when positioned in forming relationship with the workpiece, said seat being disposed at an angle to the axis of rotation of said holder to position said forming edge of said tool at a shear angle with respect to the axis of rotation of said workpiece.

3. In the combination of claim 2, said front rake angle being 15° and said shear angle being 20°.

4. In the combination as in claim 2, said front rake angle being between 8° and 23° and said shear angle being between 10° and 30°.

5. In the combination as in claim 3, said top surface of said forming tool having a rake angle of 1° when positioned in cutting relationship with the workpiece.

6. In the combination as in claim 4, said top surface of said cutting tool having a rake angle of between 0° and 2° when positioned in cutting relationship with the workpiece.

7. In the combination as in claim 2, said holder having a base surface opposite said top surface of said forming tool, said base surface being at an angle to the horizontal of the axis of rotation of said holder corresponding to the top rake angle of said top surface.

8. In a forming tool, the combination of
a tool holder rotatable about an axis,
a seat defined in said tool holder,
a forming tool of substantially rectangular cross-section in said seat,
said forming tool having front and top surfaces substantially normal to each other and defining a forming edge therebetween,
said seat positioning said front surface at an angle to the horizontal of the axis of rotation of said holder,
said holder having a planar base surface at an angle to the horizontal of the axis of rotation of said holder, the top surface of said forming tool being formed parallel to said base surface.

References Cited by the Examiner

UNITED STATES PATENTS

| | | | |
|---|---|---|---|
| 993,553 | 5/1911 | Rosenbeck | 29—98 |
| 1,366,366 | 1/1921 | Dover | 29—98 |
| 3,027,786 | 4/1962 | Severson | 77—58 |
| 3,060,771 | 10/1962 | Johnson | 77—58 |
| 3,063,318 | 11/1962 | Schlappal | 82—36 |

WILLIAM W. DYER, JR., *Primary Examiner.*

LEONIDAS VLACHOS, *Examiner.*